United States Patent
Subhani et al.

(10) Patent No.: US 11,098,153 B2
(45) Date of Patent: Aug. 24, 2021

(54) METHOD FOR PRODUCING A MULTIPLE BOND-CONTAINING PREPOLYMER AS ELASTOMER PRECURSOR

(71) Applicant: COVESTRO DEUTSCHLAND AG, Leverkusen (DE)

(72) Inventors: Muhammad Afzal Subhani, Aachen (DE); Burkhard Koehler, Zierenberg (DE); Walter Leitner, Aachen (DE); Thomas Ernst Müller, Aachen (DE); Christoph Gürtler, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 88 days.

(21) Appl. No.: 16/341,219

(22) PCT Filed: Oct. 10, 2017

(86) PCT No.: PCT/EP2017/075860
§ 371 (c)(1),
(2) Date: Apr. 11, 2019

(87) PCT Pub. No.: WO2018/069350
PCT Pub. Date: Apr. 19, 2018

(65) Prior Publication Data
US 2019/0315904 A1 Oct. 17, 2019

(30) Foreign Application Priority Data
Oct. 12, 2016 (EP) .................................... 16193568

(51) Int. Cl.
| | |
|---|---|
| *C08G 18/44* | (2006.01) |
| *C08G 18/12* | (2006.01) |
| *C08G 18/22* | (2006.01) |
| *C08G 18/76* | (2006.01) |
| *C08G 18/79* | (2006.01) |
| *C08G 18/82* | (2006.01) |
| *C08G 64/34* | (2006.01) |
| *C08G 18/64* | (2006.01) |
| *C08G 18/62* | (2006.01) |

(52) U.S. Cl.
CPC .......... *C08G 18/12* (2013.01); *C08G 18/222* (2013.01); *C08G 18/44* (2013.01); *C08G 18/62* (2013.01); *C08G 18/6237* (2013.01); *C08G 18/64* (2013.01); *C08G 18/7621* (2013.01); *C08G 18/792* (2013.01); *C08G 18/82* (2013.01); *C08G 64/34* (2013.01)

(58) Field of Classification Search
CPC ..... C08G 18/44; C08G 18/6237; C08G 18/62
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney |
| 5,470,813 A | 11/1995 | Le-Khac |
| 5,536,883 A | 7/1996 | Le-Khac |
| 5,627,120 A | 5/1997 | Le-Khac |
| 5,637,673 A | 6/1997 | Le-Khac |
| 5,714,428 A | 2/1998 | Le-Khac |
| 6,018,017 A | 1/2000 | Le-Khac |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 9,593,199 B2 | 3/2017 | Wamprecht et al. |
| 9,708,446 B2 | 7/2017 | Müller et al. |
| 9,856,357 B2 | 1/2018 | Torres et al. |
| 9,957,353 B2 | 5/2018 | Müller et al. |
| 10,179,835 B2 | 1/2019 | Müller et al. |
| 2013/0296450 A1* | 11/2013 | Hofmann ........... C08G 64/0208 521/157 |
| 2014/0329987 A1* | 11/2014 | Gurtler .................. C08G 65/26 528/366 |
| 2016/0200865 A1* | 7/2016 | Muller ............... C08G 65/2603 523/400 |
| 2017/0313816 A1 | 11/2017 | Müller et al. |
| 2018/0016741 A1* | 1/2018 | Sirochman ......... C08G 18/0838 |

FOREIGN PATENT DOCUMENTS

| | | |
|---|---|---|
| CN | 105504256 A | 4/2016 |
| JP | 1145123 A | 5/1992 |
| WO | 2014060329 A2 | 4/2014 |

OTHER PUBLICATIONS

Inoue, Shonei et al. Copolymerization of Carbon Dioxide and Epdxide With Organometallic Compounds, Die Makromolekulare Chemie [Macromolecular Chemistry] 130, 210-220 (1969).
Kember, Michael R., et al. Catalysts for CO2/Epdxide Copolymerisation, ChemComm., 47,141-163 (2011).
"Supplying a Multitude of Products for Measurable Results—Polyols and Isocyanates for Coating, Adhesive, Sealant, Elastomer and Electronic Applications" by Dow, Published Oct. 2011.

* cited by examiner

Primary Examiner — Michael L Leonard
(74) Attorney, Agent, or Firm — N. Denise Brown

(57) ABSTRACT

The present invention relates to a method for producing a prepolymer that contains carbon-carbon multiple bonds, a polyol component A) being reacted with component B) that contains isocyanate groups and the polyol component comprising a polyether carbonate polyol that contains carbon-carbon multiple bonds.

20 Claims, No Drawings

METHOD FOR PRODUCING A MULTIPLE BOND-CONTAINING PREPOLYMER AS ELASTOMER PRECURSOR

CROSS-REFERENCE TO RELATED APPLICATIONS

This application is a national stage application under 35 U.S.C. § 371 of PCT/EP2017/075860, filed Oct. 10, 2017, which claims the benefit of European Application No. 16193568.9, filed on Oct. 12, 2016, both of which are incorporated by reference herein.

FIELD

The present invention relates to a process for preparing a prepolymer containing carbon-carbon multiple bonds, wherein a polyol component A) is reacted with an isocyanate-containing component B) and the polyol component comprises a polyethercarbonate polyol comprising carbon-carbon multiple bonds.

BACKGROUND

Polyurethane elastomers based on naphthalene 1,5-diisocyanate (NDI; e.g. Desmodur® 15 from Covestro AG), a long-chain polyesterpolyol and a short-chain alkanediol were commercialized more than 60 years ago under the Vulkollan® name from Covestro AG. In this context, it is a feature of Vulkollans® that, as well as excellent mechanical-dynamic properties, they also have excellent qualities with regard to sustained use characteristics compared to many other materials. Swelling characteristics in many organic solvents are also at a remarkably favorable level.

Long-chain polyols used to date, aside from polyester polyols, have also been polyetherol polyols, polycarbonate polyols and polyetherester polyols. The choice of long-chain polyol is guided mainly by the requirements of the respective application. In this connection, reference is also made to "tailored properties". For example, polyether polyols are used when hydrolysis stability and low-temperature properties are important. For polyester polyols, advantages arise over polyetherol polyols with regard to mechanical properties and UV stability. However, one disadvantage is, for example, low microbe resistance. To a certain degree, polycarbonate polyols combine the advantages of polyether polyols and polyester polyols. The advantages of polycarbonate polyols lie particularly in their UV stability, hydrolysis stability, especially under acidic conditions, and mechanical properties.

A disadvantage of polyester polyols and polycarbonate polyols and of their blend products, the polyestercarbonate polyols, with respect to the polyether polyols is that their low-temperature characteristics are usually less advantageous. This is for structural reasons and arises from the elevated polarity of the carbonyl groups, the effect of which is normally that polyester polyols and polycarbonate polyols are semicrystalline, whereas polyetherol polyols, especially the propylene oxide-based types, the major group in commercial terms, are amorphous.

The use temperature range is limited at the upper and by the thermal characteristics of the hard segments (e.g. urethane, urea, isocyanurate groups etc.), i.e. of the structural elements present in the polyisocyanate units.

A further substance class of polyols that are useful in principle for the production of polyurethane elastomers is that of polyethercarbonate polyols. Preparation of polyether carbonate polyols by catalytic reaction of alkylene oxides (epoxides) and carbon dioxide in the presence of H-functional starter substances (starters) has been the subject of intensive study for more than 40 years (e.g. Inoue et al., Copolymerization of Carbon Dioxide and Epoxide with Organometallic Compounds; Die Makromolekulare Chemie [Macromolecular Chemistry] 130, 210-220, 1969). This reaction is shown in schematic form in scheme (1), where R is an organic radical such as alkyl, alkylaryl or aryl, each of which may also contain heteroatoms, for example O, S, Si, etc., and where e, f and g are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is highly advantageous from an environmental standpoint since this reaction is the conversion of a greenhouse gas such as $CO_2$ to a polymer. A further product formed, actually a by-product, is the cyclic carbonate shown in scheme (I) (for example, when $R=CH_3$, propylene carbonate).

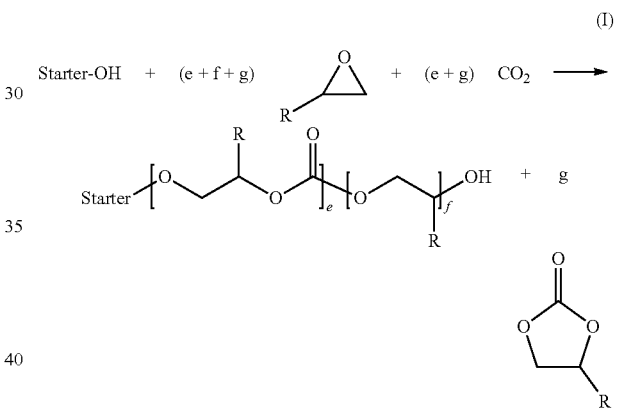

(I)

EP 2 845 872 A1 discloses a process for preparing polyethercarbonate polyols with side chains, comprising the steps of (α) initially introducing a catalyst and: (αα) a suspension medium that does not contain any H-functional groups and/or (αβ) an H-functional starter compound; (γ) metering in carbon dioxide and at least two alkylene oxides, where these alkylene oxides may be the same as or different than the alkylene oxide(s) metered in in step (β), where the difference in the molecular weight of the lightest and heaviest of the alkylene oxides metered in in stage (γ) is not less than 24 g/mol and the lightest alkylene oxide is a C2-C4-alkylene oxide and where, in addition, if no H-functional starter compound has been initially introduced in step (α), step (γ) comprises the metered addition of an H-functional starter compound. Also claimed is the use of the polyethercarbonate polyol as crosslinkable component within a crosslinking reaction for production of thermoset or elastomeric networks.

WO 2014/060329 A1 relates to a process for producing polyurethane elastomers, wherein, in a first step i), an NCO-terminated prepolymer formed from the components from the group consisting of A) at least one organic polyisocyanate containing at least two NCO groups and B) at least one polyol having a number-average molecular weight of 500 to 5000 g/mol and a functionality of 2 to 4, in the presence of C) optionally catalysts and/or D) optionally auxiliaries and additives is produced, and, in a second step ii), the prepolymer from step i) is reacted exclusively with components from the group consisting of E) one or more chain extenders and/or crosslinkers having a number average molecular weight of 60 to 490 g/mol, a functionality of 2 to 3 and exclusively OH groups as isocyanate-reactive groups in the molecule, in the presence of F) optionally catalysts and/or G) optionally auxiliaries and additives, where the molar ratio of the sum total of the CO groups from A) to the sum total of the isocyanate-reactive groups from B) and E) is 0.9:1 to 1.2:1 and component B) contains at least one polyethercarbonate polyol in an amount of at least 20% by weight, based on component B), which is obtained by addition of carbon dioxide and alkylene oxides having three or four carbon atoms onto H-functional starter substances using catalysts.

Unsaturated polyethercarbonate polyols are crosslinkable via their double bonds. For instance, WO 2015/032645 A1 discloses a process for preparing mercapto-crosslinked polyethercarbonates and sees polyethercarbonate polyols containing double bonds being reacted with polyfunctional mercaptans and/or sulfur with the involvement of initiator compounds.

Another conceivable crosslinking reaction is the reaction of the unsaturated polyethercarbonate polyols with free-radical initiators. However, their molecular weight achievable according to the current prior art is too low at least by a factor of 10 for use of the unsaturated polyethercarbonate polyols in the production of elastomers. This is the case especially when the double bonds in the polyurethanes prepared therefrom are to remain intact at first.

WO 2015/032737 A1 relates to a process for preparing polyethercarbonate polyols, the polyethercarbonate polyols comprising double bonds, comprising the steps of:
  (α) initially introducing a catalyst and:
    (αα) a suspension medium containing H-functional groups
    and/or
    (αβ) an H-functional starter compound
  (γ) metering in carbon dioxide, an alkylene oxide which contains no unsaturated group, and at least one unsaturated compound,
where the unsaturated compound metered in in step (γ) are selected from the group of the unsaturated alkylene oxides and/or unsaturated cyclic anhydrides, and
(γ1) one of the unsaturated compounds comprises a double bond comprising at least one substituent selected from the group of $-OX^1$, $-OCOX^1$, $-X^1$, $-CH_2OX^1$ and/or $-CH=CHX^1$, where $X^1$ in each case is substituted or unsubstituted alkyl, substituted or unsubstituted cycloalkyl, substituted or unsubstituted aryl or a substituted or unsubstituted methylene chain;
(γ2) and another of the unsaturated compounds comprises a double bond comprising at least one substituent selected from the group of $-F$, $-Cl$, $-Br$, $-I$, $-COH$, $COX^2$, $-COOX^2$, $-C\equiv N$ and/or $-NO_2$ or is an unsaturated, substituted or unsubstituted cyclic anhydride of an organic dicarboxylic acid, where $X^2$ in each case is substituted or unsubstituted alkyl, substituted or unsubstituted cycloalkyl, substituted or unsubstituted aryl or a substituted or unsubstituted methylene chain.

WO2015/000903 A1 discloses polyurethane resin compositions comprising polyethercarbonate polyols and polyurethane composites formed from the corresponding PU resins, although no polyethercarbonate polyols containing carbon-carbon double bonds are disclosed.

It is desirable to conduct the production of polyurethane elastomers in a two-stage process of maximum simplicity. In a first step, a prepolymer solid at room temperature is to be provided within an appropriate period of time in high yield based on the mixtures of polyisocyanates and polyoxyalkylene compounds used, this on the one hand being a processible solid but on the other hand being nontacky, i.e. has low adhesion fracture energy, and is therefore processible and especially formable in machines. In this context, owing to the lower tackiness or adhesion fracture energy, laborious cleaning of the aforementioned machines to be used is to be avoided. In the subsequent final crosslinking step, reaction of the carbon-carbon multiple bonds is to give an elastomer.

SUMMARY

It is an object of the present invention to provide a process for preparing such a prepolymer in which it is possible to use currently available polyethercarbonate polyols regardless of their molecular weight.

The object was achieved in accordance with the invention by processes for preparing a prepolymer containing carbon-carbon multiple bonds, preferably a prepolymer containing carbon-carbon double bonds, wherein a polyol component A is reacted with an isocyanate-containing component B and the polyol component comprises a polyethercarbonate polyol comprising carbon-carbon multiple bonds, preferably a polyethercarbonate polyol containing carbon-carbon double bonds, wherein the molar NCO functionality of the isocyanate-containing component B is from 2.15 to 2.90, preferably from 2.40 to 2.80, and wherein the content of carbon-carbon multiple bonds, preferably carbon-carbon double bonds, in the polyethercarbonate polyol is from 0.5% by weight to 17.0% by weight, preferably from 1.0% by weight to 6.0% by weight and more preferably from 1.5% by weight 3.0% by weight.

It has been found that the prepolymers obtainable by the process according to the invention have a network density favorable for further processing thereof. Nontacky solids are obtained, in which the multiple bonds, preferably double bonds, of the polyethercarbonate polyol are preserved. The prepolymers have high elasticity and low adhesion fracture energy (low bonding force).

DETAILED DESCRIPTION

The average molar NCO functionality is understood here to mean the average number of NCO groups per molecule of the isocyanates used in the mixture. The average molar NCO functionality of the isocyanate-containing component B is calculated here from the molar proportions of isocyanates used and their respective average molar NCO functionality as follows:

$$I_B = \sum_i (x_i \times I_i)$$

where $I_B$ is the average molar NCO functionality of the isocyanate-containing component B, $x_i$ is the molar proportion of the respective isocyanate i in component B and L is the average molar NCO functionality of isocyanate i. Unless indicated otherwise, the term "multiple bond" in the context of the present application means a carbon-carbon multiple bond comprising a carbon-carbon double or triple bond, preferably a carbon-carbon double bond, which is not part of an aromatic system.

The content of carbon-carbon multiple bonds, preferably carbon-carbon double bonds, in the polyethercarbonate polyol for the polyethercarbonate polyol containing carbon-carbon double bonds is found as the quotient of the reported double bond content of the polyethercarbonate polyols used reported in C2H4 equivalents per unit total mass of the, and is reported in C2H4 equivalents per unit mass of polyethercarbonate polyol. For the polyethercarbonate polyol containing carbon-carbon triple bonds as the quotient of the reported triple bond content of the polyethercarbonate polyols used reported in $C_2H_2$ equivalents per unit total mass of the and is reported in $C_2H_2$ equivalents per unit mass of polyethercarbonate polyol.

In the process according to the invention, polyethercarbonate polyols are also understood to mean polyethercarbonate polyols, polyetherpolyestercarbonate polyols and/or polycarbonate polyols.

In a further preferred embodiment, the polyethercarbonate polyol containing carbon-carbon multiple bonds, preferably the polyethercarbonate polyol containing carbon-carbon double bonds, is obtainable by addition of an alkylene oxide, at least one monomer containing carbon-carbon multiple bonds and $CO_2$ onto an H-functional starter compound in the presence of a double metal cyanide catalyst.

In the process according to the invention, alkylene oxides used may be alkylene oxides having 2-45 carbon atoms. The alkylene oxides having 2-45 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, alkylene oxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octane oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctone oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example glycidyl ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. Alkylene oxides used are preferably ethylene oxide and/or propylene oxide, especially propylene oxide. If ethylene oxide and propylene oxide are used in a mixture, the molar EO/PO ratio is 1:99 to 99:1, preferably 5:95 to 50:50. If ethylene oxide and/or propylene oxide are used in a mixture with other unsaturated alkylene oxides, the proportion thereof is 1 to 40 mol %, preferably 2 to 20 mol %.

A catalyst that may be used for preparing the polyether carbonate polyols according to the invention is, for example, a DMC catalyst (double metal cyanide catalyst). Other catalysts may also be employed alternatively or in addition. For the copolymerization of alkylene oxides and $CO_2$ zinc carboxylates or cobalt salen complexes for example may be employed alternatively or in addition. Suitable zinc carboxylates are for example zinc salts of carboxylic acids, in particular dicarboxylic acids, such as adipic acid or glutaric acid. An overview of the known catalysts for the copolymerization of alkylene oxides and $CO_2$ is provided for example by Chemical Communications 47 (2011) 141-163.

The catalyst is preferably a DMC catalyst.

The double metal cyanide compounds present in the DMC catalysts preferentially employable in the process according to the invention are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and allow for preparation of polyether carbonates at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by
(1) in the first step reacting an aqueous solution of a metal salt with the aqueous solution of a metal cyanide salt in the presence of one or more organic complex ligands, for example an ether or alcohol,
(2) in the second step removing the solid from the suspension obtained from (a) by known techniques (such as centrifugation or filtration),
(3) in a third step optionally washing the isolated solid with an aqueous solution of an organic complex ligand (for example by resuspending and subsequent reisolation by filtration or centrifugation),
(4) and subsequently drying the obtained solid at temperatures of in general 20-120° C. and at pressures of in general 0.1 mbar to atmospheric pressure (1013 mbar), optionally after pulverizing,
and by, in the first step or immediately after the precipitation of the double metal cyanide compound (second step), adding one or more organic complex ligands, preferably in excess (based on the double metal cyanide compound) and optionally further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (II), $$M(X)_n \tag{II}$$

where
M is selected from the metal cations $Zn^{2+}$, $Fe^{2+}$, $Ni^{2+}$, $Mn^{2+}$, $Co^{2+}$, $Sn^{2+}$, $Sn^{2+}$, $Pb^{2+}$ and $Cu^{2+}$, and M is preferably $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate, and n is 2 when X=halide, hydroxide, carboxylate, cyanate, thiocyanate, isocyanate, isothiocyanate or nitrate, or suitable metal salts preferably have a composition according to the general formula (III)

$$M_r(X)_3 \tag{III}$$

where

M is selected from the metal cations $Fe^{3+}$, $Al^{3+}$, $Co^{3+}$ and $Cr^{3+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts preferably have a composition according to the general formula (IV)

$$M(X)_s \tag{IV}$$

where

M is selected from the metal cations $Mo^{4+}$, $V^{4+}$ and $W^{4+}$,

X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate, and s is 4 when X=halide, hydroxide, carboxylate, cyanate, thiocyanate, isocyanate, isothiocyanate or nitrate, or suitable metal salts preferably have a composition according to the general formula (V)

$$M(X)_t \tag{V}$$

where

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate, and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(H) bromide, iron(II) chloride, iron(III) chloride, cobalt(II) chloride, cobalt(III) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_aM'(CN)_b(A)_c \tag{VI}$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V), M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, where the values of a, b and c are chosen so as to ensure the electrical neutrality of the metal cyanide salt; a is preferably 1, 2, 3 or 4; b is preferably 4, 5 or 6; c preferably has the value of 0.

Examples of suitable metal cyanide salts are sodium hexacyanocobaltate(Ill), potassium hexacyanocobaltate(III), potassium hexacyanoferrate(II), potassium hexacyanoferrate(I), calcium hexacyanocobaltate(II) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z \tag{VII}$$

in which M is as defined in formulae (I) to (IV) and

M' is as defined in formula (V), and x, x', y and z are integers chosen so as to ensure electrical neutrality of the double metal cyanide compound.

It is preferable when x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(II), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, $\alpha,\beta$-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, for example, water-soluble by-products, such as potassium chloride, can be removed from the catalyst that can be used in accordance with the invention. Preferably, the amount of the organic complex ligand in the aqueous wash solution is between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solids more than once. In a first washing step (3.-1), washing takes place preferably with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous wash solution is more preferably between 40% and 80% by weight, based on the overall solution of the first washing step. In the further washing steps (3.-2), either the first washing step is repeated one or more times, preferably from one to three times, or, preferably, a nonaqueous solution, such as a mixture or solution of unsaturated alcohol and further complex-forming component (preferably in the range between 0.5% and 5.0% by weight, based on the total amount of the wash solution of step (3.-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

For the preparation of the polyethercarbonate polyols of the invention, in addition, at least one H-functional starter compound is used.

As suitable H-functional starter compounds (starters) it is possible to use compounds having H atoms that are active in respect of the alkoxylation. Alkoxylation-active groups having active H atoms include, for example, —OH, —NH$_2$ (primary amines), —NH— (secondary amines), —SH, and —CO$_2$H, preference being given to —OH and —NH$_2$, particular preference being given to —OH. As H-functional starter substance it is possible for there to be, for example, one or more compounds selected from the group encompassing mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters which contain on average at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyol®™ products (USSC Co.).

Employable monofunctional starter compounds include alcohols, amines, thiols and carboxylic acids. Employable monofunctional alcohols include: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. Employable monofunctional thiols include: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances are dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanetanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols constructed from repeating propylene oxide and/or ethylene oxide units are, for example, the Desmophen®, Acclaim®, Arcol®, Baycoll®, Bayfill®, Bayflex®, Baygal®, PET® and polyether polyols from Covestro AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® 8180). Further suitable homopolyethylene oxides are, for example, the Pluriol® E products from BASF SE, suitable homopolypropylene oxides are, for example, the Pluriol® P products from BASF SE, and suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight M, in the range from 200 to 4500 g/mol. Polyester polyols used may be at least difunctional polyesters. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Alcohol components employed include for example ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the stated alcohols. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

As H-functional starter substances it is additionally possible to use polycarbonate diols, especially those having a molecular weight M, in a range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples relating to polycarbonates are found for example in EP-A 1359177. Examples of polycarbonate diols that may be used include the Desmophen® C range from Covestro AG, for example Desmophen® C 1100 or Desmophen® C 2200.

In a further embodiment of the invention, it is possible to use polyethercarbonate polyols and/or polyetherestercarbonate polyols as H-functional starter substances. In particular it is possible to use polyetherester carbonate polyols. These polyetherestercarbonate polyols used as H-functional starter substances may for this purpose be prepared in a separate reaction step beforehand.

The H-functional starter substances generally have an OH-functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula (VIII)

$$HO-(CH_2)_x-OH \qquad (VIII)$$

where x is a number from 1 to 20, preferably an even number from 2 to 20. Examples of alcohols of formula (VII) are ethylene glycol, butane-1,4-diol, hexane-1,6-diol, octane-1,8-diol, decane-1,10-diol and dodecane-1,12-diol. Further preferred H-functional starter substances are neopentyl glycol, trimethylolpropane, glycerol, pentaerythritol, reaction products of the alcohols of formula (VII) with ε-caprolactone, for example reaction products of trimethylolpropane with ε-caprolactone, reaction products of glycerol with ε-caprolactone and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and more particularly a molecular weight $M_n$ in the range from 62 to 3000 g/mol.

The $CO_2$ used in accordance with the invention must have a purity level of at least 80%, preferably of at least 95%, where the proportion of sulfur-containing impurities, such as COS or $SO_2$, must be below 1% by weight, preferably below 0.1% by weight. Preference is given to using $CO_2$ obtained as by-product in ammonia production, ethylene oxide production, by the water-gas shift reaction, in combustion processes, preferably in power plants, or in lime burning. There may be a need for subsequent purification steps in which sulfur-containing impurities in particular, but also carbon monoxide, are removed. Inert gases, such as nitrogen or argon, may be present up to a content of below 20%, preferably below 5%. Particular preference is given to using $CO_2$ which is obtained as by-product in ammonia production or is prepared by water-gas shift reaction since $CO_2$ from these sources has particularly low contents of sulfur-containing impurities.

In a further embodiment of the process according to the invention, the polyethercarbonate polyol comprising carbon-carbon multiple bonds, preferably the polyethercarbonate polyol comprising carbon-carbon double bonds, has a $CO_2$ content of 3% by weight to 50% by weight, preferably of 5% by weight to 25% by weight.

In a further configuration of the process, the monomer containing carbon-carbon multiple bonds is selected from at least one of the monomers from one or more of the groups consisting of (a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids for example oleic acid, linoleic acid, conjuene fatty acid, or linolenic acid, partly epoxidized fats and oils, such as partly epoxidized soya oil, linseed oil, rapeseed oil, palm oil or sunflower oil, and/or mixtures thereof.

(b) alkylene oxide with double bond of the general formula (IX):

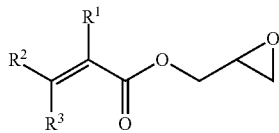

where $R_1$ to $R_3$ are independently H, halogen, substituted or unsubstituted C1-C22 alkyl or substituted or unsubstituted C6-C12 aryl. As preferred representatives of the group of the glycidyl esters of α,β-unsaturated acids, the compounds of formula (IX) above display a substitution pattern which is particularly suitable for the synthesis of polyethercarbonate polyols having unsaturated groups. This class of compound can be reacted with high yields, by means of the DMC catalyst employable in accordance with the invention, to give polyethercarbonate polyols having unsaturated groups. Furthermore, as a result of the steric and electronic conditions in the region of the double bond, there may be good opportunities for further reaction to give higher-molecular-weight, crosslinked polyethercarbonate polyols.

(c) cyclic anhydride conforming to the formula (X), (XI) or (XII):

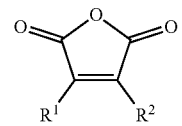

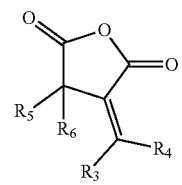

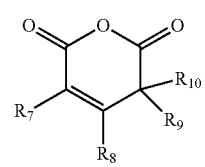

where $R_1$ to $R_{10}$ are independently H, halogen, substituted or unsubstituted C1-C22 alkyl or substituted or unsubstituted C6-C12 aryl. Preferred compounds of the formula (IX), (X) (XI) are maleic anhydride, halogen- or alkyl-substituted maleic anhydrides, and itaconic anhydride.

(d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

and (e) alkylene oxides with substituents having carbon-carbon triple bonds.

In a further configuration of the process, the monomer containing carbon-carbon multiple bonds is selected from at least one of the monomers from one or more of the groups consisting of (a) allyl glycidyl ether, vinylcyclohexene oxide and limonene oxide,
(b) glycidyl acrylate and glycidyl methacrylate,
(c) maleic anhydride and itaconic anhydride,
(d) 4-cyclohexene-1,2-dioic anhydride and 5,6-norbornene-2,3-dioic anhydride and
(e) glycidyl propargyl ether.

The molar ratio of the saturated alkylene oxides used to the unsaturated alkylene oxides and anhydrides used, or mixture thereof, is from 55.0 mol % to 99.5 mol %, preferably from 60.0 mol % to 99.0 mol %.

The unsaturated comonomers may be distributed randomly or in blocks in the polyethercarbonate polyols containing multiple bonds. Gradient polymers can also be used.

The term "terpolymerization" in the sense of the invention comprehends the polymerization of at least one alkylene oxide, at least one comonomer having a multiple bond (alkylene oxide and/or cyclic anhydride), and $CO_2$. Terpolymerization in the sense of the invention also includes, in particular, the copolymerization of a total of more than three monomers.

One preferred embodiment of the process which can be used in accordance with the invention for preparing polyethercarbonate polyols containing multiple bonds is characterized in that (α) [first activation stage] a suspension medium containing no H-functional groups, an H-functional starter compound, a mixture of a suspension medium which contains no H-functional groups and an H-functional starter compound, or a mixture of at least two H-functional starter compounds is introduced initially, and optionally water and/or other volatile compounds are removed by elevated temperature and/or reduced pressure, with the DMC catalyst being added to the suspension medium which contains no H-functional groups, the H-functional starter compound, the mixture of a suspension medium which contains no H-functional groups and the H-functional starter compound, or the mixture of at least two H-functional starter compounds, before or after the first activation stage, (β) [second activation stage] a portion (based on the total amount of the amount of alkylene oxides used in steps (β) and (γ)) of one or more alkylene oxides is added to the mixture resulting from step (α), it being possible for the addition of a portion of alkylene oxide to take place optionally in the presence of $CO_2$ and/or inert gas (such as nitrogen or argon, for example), and it also being possible for step (β) to take place two or more times, (γ) [polymerization stage] one or more alkylene oxides, at least one unsaturated compound (alkylene oxide and/or cyclic anhydride), and carbon dioxide are metered continually into the mixture resulting from step (β), and the alkylene oxides used for the terpolymerization may be the same as or different from the alkylene oxides used in step (β).

There follows a detailed description of this preferred embodiment using the example of the polyethercarbonate polyols.

Step (α):

The addition of the individual components in step (α) may take place simultaneously or in succession in any order, preferably, in step (α), the DMC catalyst is introduced first, and, simultaneously or subsequently, the suspension medium which contains no H-functional groups, the H-functional starter compound, the mixture of a suspension medium which contains no H-functional groups and the H-functional starter compound, or the mixture of at least two H-functional starter compounds is added.

The subject of one preferred embodiment is a process in which in step (α) [first activation stage]

(α1) a reactor is charged with the DMC catalyst and a suspension medium and/or one or more H-functional starter compounds, (α2) an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

The subject of another preferred embodiment is a method in which in step (α) [first activation stage]

(α1) a suspension medium which contains no H-functional groups, an H-functional starter compound, a mixture of a suspension medium which contains no H-functional groups and an H-functional starter compound, or a mixture of at least two H-functional starter compounds is initially introduced, optionally under inert gas atmosphere, under an atmosphere of inert gas/carbon dioxide mixture, or under a pure carbon dioxide atmosphere, more preferably under inert gas atmosphere, and (α2) an inert gas, an inert gas/carbon dioxide mixture or carbon dioxide, more preferably inert gas, is introduced into the resulting mixture of the DMC catalyst and the suspension medium which contains no H-functional groups, the H-functional starter compound, the mixture of a suspension medium which contains no H-functional groups and the H-functional starter compound, or the mixture of at least two H-functional starter compounds, at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example), it being possible for the double metal cyanide catalyst to be added to the suspension medium which contains no H-functional groups, the H-functional starter compound, the mixture of a suspension medium which contains no H-functional groups and the H-functional starter compound, or the mixture of at least two H-functional starter compounds in step (cal) or immediately thereafter in step (α2).

The DMC catalyst may be added in solid form or in suspension in a suspension medium and/or in an H-functional starter compound. If the DMC catalyst is added as a suspension, it is added preferably in step (α1) to the suspension medium and/or to the one or more H-functional starter compounds.

Step (β):

Step (β) of the second activation stage may take place in the presence of $CO_2$ and/or inert gas. Step (β) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The start of the metered addition of the alkylene oxide may take place at any supply pressure chosen beforehand. The total pressure (in absolute terms) of the atmosphere is set in step (1) preferably in the range from 10 mbar to 100 bar, preferably 100 mbar to 50 bar, and more preferably 500 mbar to 50 bar. Optionally, during or after the metering of the alkylene oxide, the pressure is under closed-loop control by introduction of further carbon dioxide, with the pressure (absolute) being 10 mbar to 100 bar, preferably 100 mbar to 50 bar, and more preferably 500 mbar to 50 bar.

In one preferred embodiment, the amount of one or more alkylene oxides used in the case of the activation in step (β) is 0.1% to 25.0% by weight, preferably 1.0% to 20.0% by weight, more preferably 2.0% to 16.0% by weight, based on the amount of suspension medium and/or H-functional starter compound used in step (α). The alkylene oxide may be added in one step or in a stepwise addition in two or more portions.

In one particularly preferred embodiment of the invention, a portion (based on the total amount of the amount of alkylene oxides used in steps (β) and (γ)) of one or more alkylene oxides, in the case of the activation in step (β) [second activation stage], is added to the mixture resulting from step (α), it being possible for the addition of a portion of alkylene oxide to take place optionally in the presence of $CO_2$ and/or inert gas. Step (β) may also take place more than once. The DMC catalyst is preferably used in an amount such that the amount of DMC catalyst in the resulting polyethercarbonate polyol containing multiple bonds is 10 to 10 000 ppm, more preferably 20 to 5000 ppm and most preferably 50 to 500 ppm.

In the second activation step, the alkylene oxide may be added, for example, in one portion or over the course of 1 to 15 minutes, preferably 5 to 10 minutes. The duration of the second activation step is preferably 15 to 240 minutes, more preferably 20 to 60 minutes.

Step ($\gamma$):

The metering of the alkylene oxide(s), of the unsaturated compounds, also referred to below as monomers, and of the carbon dioxide may take place simultaneously, or alternately, or sequentially, and the overall amount of carbon dioxide may be added all at once or in a metered way over the reaction time. During the addition of the monomers it is possible for the $CO_2$ pressure, gradually or in steps, to be raised or lowered or left the same. Preferably, the total pressure is kept constant during the reaction by metered addition of further carbon dioxide. The metering of the monomers may take place simultaneously, alternatively, or sequentially to the metering of carbon dioxide. It is possible to meter the monomers at a constant metering rate or to raise or lower the metering rate continuously or in steps, or to add the monomers in portions. The monomers are preferably added at constant metering rate to the reaction mixture. If two or more alkylene oxides are used for synthesis of the polyether carbonate polyols containing multiple bonds, the alkylene oxides may be metered in individually or as a mixture. The metered addition of the alkylene oxides may be effected simultaneously, alternately or sequentially, each via separate metering points (addition points), or via one or more metering points and the alkylene oxides may be metered in individually or as a mixture. Via the nature and/or sequence of the metering of the monomers and/or of the carbon dioxide it is possible to synthesize random, alternating, blocklike or gradientlike polyether carbonate polyols containing double bonds.

Preference is given to using an excess of carbon dioxide, relative to the calculated amount of carbon dioxide needed in polyethercarbonate polyol containing multiple bonds, since an excess of carbon dioxide is an advantage, governed by the slowness of carbon dioxide to react. The amount of carbon dioxide can be specified by way of the total pressure. A total pressure (absolute) which has proven advantageous is the range from 0.01 to 120 bar, preferably 0.1 to 110 bar, more preferably from 1 to 100 bar, for the copolymerization for preparing the polyethercarbonate polyols containing multiple bonds. It is possible to supply the carbon dioxide to the reaction vessel continuously or discontinuously. This is dependent on the rate at which the monomers and the $CO_2$ are consumed and on whether the product is to include optionally $CO_2$-free polyether blocks or blocks with different $CO_2$ contents. The concentration of the carbon dioxide may also vary during the addition of the monomers. Depending on the reaction conditions selected, it is possible for the $CO_2$ to be introduced into the reactor in the gaseous, liquid or supercritical state. $CO_2$ may also be added to the reactor as a solid and then converted to the gaseous, dissolved, liquid and/or supercritical state under the chosen reaction conditions.

In step ($\gamma$), the carbon dioxide can be introduced into the mixture, for example, by
  (i) sparging the reaction mixture in the reactor from below,
  (ii) using a hollow-shaft stirrer,
  (iii) a combination of metering forms as per (i) and (ii), and/or
  (iv) sparging via the surface of the liquid, by using multilevel stirring elements.

Step ($\gamma$) is conducted, for example, at temperatures of 60 to 150° C., preferably from 80 to 120° C., most preferably from 90 to 110° C. If temperatures below 60° C. are set, the reaction ceases. At temperatures above 150° C. the amount of unwanted by-products rises significantly.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the bottom of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing C02 and any unconsumed monomers) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas sucked from the gas space above the reaction mixture and compressed, optionally mixed with fresh carbon dioxide and/or monomers, is introduced back into the reaction mixture as per (i), (ii), (iii) and/or (iv).

The pressure drop which comes about through incorporation of the carbon dioxide and the monomers into the reaction product in the terpolymerization is preferably balanced out by means of freshly metered carbon dioxide.

The monomers may be introduced separately or together with the $CO_2$, either via the liquid surface or directly into the liquid phase. The monomers are introduced preferably directly into the liquid phase, since this has the advantage of rapid mixing between the monomers introduced and the liquid phase, so preventing local concentration peaks of the monomers. The introduction into the liquid phase can be effected via one or more inlet tubes, one or more nozzles or one or more annular arrangements of multiple metering points, which are preferably arranged at the base of the reactor and/or at the side wall of the reactor.

The three steps ($\alpha$), ($\beta$) and ($\gamma$) can be performed in the same reactor, or each can be performed separately in different reactors. Particularly preferred reactor types are stirred tanks, tubular reactors and loop reactors. If the reaction steps ($\alpha$), ($\beta$) and ($\gamma$) are performed in different reactors, a different reactor type can be used for each step.

Polyethercarbonate polyols containing multiple bonds can be prepared in a stirred tank, in which case the stirred tank, depending on design and mode of operation, is cooled via the reactor shell, internal cooling surfaces and/or cooling surfaces within a pumped circulation system. Both in semi-batchwise application, in which the product is not removed until after the end of the reaction, and in continuous application, where the product is removed continuously, particular attention should be given to the metering rate of the monomers. It should be set so that, in spite of the inhibitory effect of the carbon dioxide, the monomers are depleted sufficiently rapidly by reaction. The concentration of free monomers in the reaction mixture during the second activation stage (step $\beta$) is preferably >0% to 100% by weight, more preferably >0% to 50% by weight, very preferably >0% to 20% by weight (based in each case on the weight of the reaction mixture). The concentration of free monomers in the reaction mixture during the reaction (step γ) is preferably >0% to 40% by weight, more preferably >0% to 25% by weight, very preferably >0% to 15% by weight (based in each case on the weight of the reaction mixture).

Another possible embodiment for the copolymerization (step γ) is characterized in that one or more H-functional starter compounds as well are metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). When performing the process continuously, the amount of the H-functional starter compounds metered into the reactor continuously during the reaction is preferably at least 80 mol % equivalents, particularly preferably 95 to 99.99 mol % equivalents (in each case based on the total amount of H-functional starter compounds).

In one preferred embodiment, the catalyst/starter mixture activated in steps (α) and (β) is reacted further in the same reactor with the monomers and carbon dioxide. In another preferred embodiment, the catalyst/starter mixture activated in steps (α) and (β) is reacted further in a different reaction vessel (for example, a stirred tank, tubular reactor or loop reactor) with the monomers and carbon dioxide. In a further preferred embodiment, the catalyst/starter mixture prepared in step (α) is reacted in a different reaction vessel (for example, a stirred tank, tubular reactor or loop reactor) in steps (β) and (γ) with the monomers and carbon dioxide.

In the case of reaction in a tubular reactor, the catalyst/starter mixture prepared in step (α), or the catalyst/starter mixture activated in steps (α) and (β), and optionally further starters, and also the monomers and carbon dioxide, are pumped continuously through a tube. When a catalyst/starter mixture prepared in step (α) is used, the second activation stage in step (β) takes place in the first part of the tubular reactor, and the terpolymerization in step (γ) takes place in the second part of the tubular reactor. The molar ratios of the co-reactants vary according to the desired polymer.

In one process variant, carbon dioxide is metered in its liquid or supercritical form, in order to permit optimum miscibility of the components. The carbon dioxide can be introduced at the inlet of the reactor and/or via metering points which are arranged along the reactor, in the reactor. A portion of the monomers may be introduced at the inlet of the reactor. The remaining amount of the monomers is introduced into the reactor preferably via two or more metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. Preferably, the mixing elements mix $CO_2$ which is being metered in and the monomers with the reaction mixture. In an alternative embodiment, different volume elements of the reaction mixture are mixed with one another.

Loop reactors can likewise be used to prepare polyethercarbonate polyols containing multiple bonds.

These generally include reactors having internal and/or external material recycling (optionally with heat exchanger surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("delay tube") in which residual concentrations of free monomers present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10° C. to 150° C. and more preferably 20° C. to 100° C. At the end of the post-reaction time or at the outlet of the downstream reactor, the reaction mixture contains preferably less than 0.05% by weight of monomers. The post-reaction time or the residence time in the downstream reactor is preferably 10 min to 24 h, especially preferably 10 min to 3 h.

In a further preferred embodiment of the process for preparing the polyethercarbonate polyols, the temperature in step (γ) may be not less than 60° C. and not more than 150° C. In a particularly preferred embodiment of the process, the temperature in step (γ) may be greater than or equal to 80° C. and less than or equal to 130° C., and very preferably greater than or equal to 90° C. and less than or equal to 120° C. This temperature range during the polymerization has proven particularly suitable for synthesis of the polyethercarbonate polyols containing unsaturated groups with a sufficient reaction rate and with a high selectivity. In the range of lower temperatures, the reaction rate which comes about may only be inadequate, and, at higher temperatures, the fraction of unwanted by-products may increase too greatly. If temperatures are selected that are too high, there may, for example, be premature crosslinking of the unsaturated groups.

The polyethercarbonate polyols containing multiple bonds that are obtainable in accordance with the invention preferably have an average OH functionality (i.e., average number of OH groups per molecule) of at least 1.0, preferably of 1.5 to 10, more preferably of ≥1.8 to ≤2.2.

The molecular weight of the resulting polyethercarbonate polyols containing multiple bonds is preferably at least 400 g/mol, more preferably 400 to 1 000 000 g/mol and most preferably 500 to 60 000 g/mol.

The suspension media which are used in step (α) for suspending the catalyst contain no H-functional groups. Suitable suspension media are any polar aprotic, weakly polar aprotic and nonpolar aprotic solvents, none of which contain any H-functional groups. The suspension media used may also be a mixture of two or more of these suspension media. The following polar aprotic solvents are mentioned here by way of example: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step (α) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, β-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of alkylene oxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides are cyclic compounds containing an anhydride group in the ring. Preferred compounds are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Component B corresponds to an isocyanate-containing component having an average molar NCO functionality of 2.15 to 2.9, preferably of 2.4 to 2.8.

Suitable polyisocyanates of component B are the aromatic, araliphatic, aliphatic or cycloaliphatic polyisocyanates known per so to those skilled in the art which may also comprise iminooxadiazinedione, isocyanurate, uretdione, urethane, allophanate, biuret, urea, oxadiazinetrione, oxazolidinone, acylurea, carbamate and/or carbodiimide structures. These may be employed individually or in any desired mixtures with one another in B.

The aforementioned polyisocyanates are based on diisocyanates or triisocyanates or higher-functional isocyanates known per se to those skilled in the art having aliphatically, cycloaliphatically, araliphatically and/or aromatically bonded isocyanate groups, it being immaterial whether these were produced using phosgene or by phosgene-free processes. Examples of such diisocyanates or triisocyanates or higher-functional isocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4-/2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Covestro AG, Leverkusen, DE), 4-isocyanatomethyl-1,8-octane diisocyanate (triisocyanatononane, TIN), ω,ω'-diisocyanato-1,3-dimethylcyclohexane (H$_6$XDI), 1-isocyanato-1-methyl-β-isocyanatomethylcyclohexane, 1-isocyanato-1-methyl-4-isocyanatomethylcyclohexane, bis(isocyanatomethyl)norbornane, naphthalene 1,5-diisocyanate, 1,3- and 1,4-bis(2-isocyanatoprop-2-yl)benzene (TMXDI), 2,4- and 2,6-diisocyanatotoluene (TDI), in particular the 2,4 and the 2,6 isomers and industrial mixtures of the two isomers, 2,4'- and 4,4'-diisocyanatodiphenylmethane (MDI), 1,5-diisocyanatonaphthalene, 1,3-bis(isocyanatomethyl)benzene (XDI) and any desired mixtures of the recited compounds and also polyfunctional isocyanates obtained by dimerization or trimerization or higher oligomerization of the aforementioned isocyanates and comprising isocyanurate rings, iminooxadiazinedione rings, uretdione rings, uretonimine rings and also polyfunctional isocyanates obtained by adduct formation of the recited isocyanates onto mixtures of different polyhydric alcohols, such as TMP, TME or pentaerythritol.

These compounds of component B preferably have a content of isocyanate groups of 2% by weight to 60% by weight, preferably of 15% by weight to 50% by weight.

Particular preference is given to using, in component B, polyisocyanates or polyisocyanate mixtures of the aforementioned type having exclusively aliphatically and/or aromatically bonded isocyanate groups.

Most preferably, the isocyanate-containing component B comprises at least 2 polyisocyanates selected from the group consisting of HDI, MDI, TDI, the trimerization or higher oligomerization products thereof and adducts thereof.

Preferably, component B corresponds to an isocyanate-containing component having an average molar NCO functionality of 2.15 to 2.9, and the isocyanate-containing component B comprises at least one polyisocyanate B1 having an average molar NCO functionality of 2.0 to 2.2 and at least one polyisocyanate B2 having an average molar NCO functionality of 2.8 to 3.2, preferably a mixture of a diisocyanate monomer and a diisocyanate trimer. Preferably, the diisocyanate monomer is MDI and/or TDI and the trimer is an HDI-based trimer (e.g. Covestro Desmodur N3300 or Desmodur N3600).

More preferably, component B corresponds to an isocyanate-containing component having an average molar NCO functionality of 2.4 to 2.9, and the isocyanate-containing component B comprises one polyisocyanate B1 having an average molar NCO functionality of 1.8 to 2.2 and one polyisocyanate B2 having an average molar NCO functionality of 2.8 to 3.2, preferably a mixture of a diisocyanate monomer and a diisocyanate trimer. Preferably, the diisocyanate monomer is MDI and/or TDI and the trimer is an HDI-based trimer.

In the process of the invention, the reaction of the polyol component A with the isocyanate-containing component B is preferably conducted at an NCO index of 0.80 to 1.30, more preferably of 0.95 to 1.20 and most preferably of 0.98 to 1.10.

For reaction of the polyol component A with component B, it is possible to use catalysts that catalyze the NCO—OH reaction. Such catalysts are known to those skilled in the art. Examples include: DBTL, DABCO, dibutyltin oxide, tin dioctate, tin dichloride, zinc octoate, bismuth octoate, bismuth neodecanoate or DBU. In addition, it is also possible to use the auxiliaries and additives customary in polyurethane chemistry, for example plasticizers, antioxidants, and UV and heat stabilizers.

The invention also provides a prepolymer containing carbon-carbon multiple bonds, preferably a prepolymer containing carbon-carbon double bonds, obtainable by a process as described on the preceding pages.

In a preferred embodiment, the content of carbon-carbon multiple bonds in the prepolymer is from 0.5% by weight to 15.0% by weight, more preferably 1.0% by weight to 6.0% by weight and most preferably 1.5% by weight to 3.0% by weight.

In a further embodiment, a prepolymer containing carbon-carbon multiple bonds, preferably carbon-carbon double bonds, is also obtainable by reacting a polyol component A with an isocyanate-containing component B, wherein the polyol component comprises a polyethercarbonate polyol comprising carbon-carbon multiple bonds, preferably carbon-carbon double bonds, and wherein the content of carbon-carbon multiple bonds, preferably carbon-carbon double bonds, is from 0.5% by weight to 15.0% by weight, more preferably 1.0% by weight to 6.0% by weight and most preferably 1.5% by weight to 3.0% by weight.

The content of carbon-carbon multiple bonds, preferably carbon-carbon double bonds, in the prepolymers for the prepolymer containing carbon-carbon double bonds is found as the quotient of the reported double bond content of the polyethercarbonate polyols used (reported in $C_2H_4$ equivalents per unit mass of polyethercarbonate polyol), based on the total mass of the reactants used (polyethercarbonate polyol, isocyanate mixture, catalyst), and is reported in $C_2H_1$ equivalents per unit mass of prepolymer. For the prepolymer containing carbon-carbon triple bonds as the quotient of the reported triple bond content of the polyethercarbonate polyols used (reported in $C_2H_2$ equivalents per unit mass of polyethercarbonate polyol), based on the total mass of the reactants used (polyethercarbonate polyol, isocyanate mixture, catalyst), and is reported in $C_2H_2$ equivalents per unit mass of prepolymer.

In a likewise preferred embodiment, the prepolymer has a content of $CO_2$ incorporated into the prepolymer of not less than 5% by weight, more preferably not less than 10% by weight and most preferably not less than 20% by weight. In a preferred embodiment of the process, the NCO index in the preparation of the prepolymer is from 0.80 to 1.30, more preferably from 0.95 to 1.20 and most preferably from 0.98 to 1.10.

The invention further provides a process for producing an elastomer, comprising the steps of:
  a-1) providing a prepolymer containing carbon-carbon multiple bonds, preferably one containing carbon-carbon double bonds according to the above description,
  b-1) crosslinking the prepolymer.

The invention further provides a process for producing an elastomer, comprising the steps of:
  a-2) providing a prepolymer containing carbon-carbon multiple bonds prepared by the process of the invention, preferably one containing carbon-carbon double bonds according to the above description,
  b-2) crosslinking the prepolymer.

The crosslinking step b-1) or b-2) here is preferably effected at temperatures of ≥30° C. to ≤200° C., more preferably of ≥60° C. to ≤180° C.

Preference is likewise given to conducting the crosslinking of the prepolymer in step b-1) or b-2) in the presence of at least one crosslinker.

The invention further provides an elastomer obtainable by the process described above.

EXAMPLES

The present invention is described in detail by the examples which follow, but without being restricted thereto.
Feedstocks:
H-Functional Starter Compounds
PET-1: difunctional poly(oxypropylene)polyol from Covestro AG with an OH number of 112 $mg_{KOH}/g$
Alkylene Oxides
PO: propylene oxide from Chemgas, purity >99%
AGE: allyl glycidyl ether from Sigma Aldrich, purity >99%
Anydrides
MA: maleic anhydride from Sigma Aldrich, purity >99%
Isocyanates
TDI: diisocyanate having an average molar NCO functionality of 2.00 Desmodur T100 from Covestro AG, F2, $M_n$ 174 g/mol, equivalent weight 78 g/mol, NCO content 48.0% by weight
HDI trimer triisocyanate having an average molar NCO functionality of 3.10
  Desmodur N3600 from Covestro AG, $M_n$ 570 g/mol, equivalent weight 148 g/mol, NCO content 32.0% by weight
Catalyst
DMC: The DMC catalyst used in all examples was DMC catalyst prepared according to example 6 in WO 01/80994 A1.
DBTL: dibutyltin dilaurate from Sigma Aldrich, purity >95%
Reactors
The polymerization reactions were conducted in a 300 ml Parr pressure reactor. The pressure reactor used in the examples had a height (internal) of 10.16 cm and an internal diameter of 635 cm. The reactor was equipped with an electrical heating jacket (510 watts' maximum heating power). The counter-cooling consisted of an immersed tube of external diameter 6 mm which had been bent into a U shape aid which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the adjustment, the heating power varied by ±5% of the maximum heating power. The incidence of an elevated evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor. The incidence of evolution of heat in the reactor, brought about by the continuous reaction of propylene oxide and of the compounds containing multiple bonds during the reaction [polymerization stage], led to a fall in the power of the heating jacket to about 8% of the maximum heating power. As a result of the adjustment, the heating power varied by ±5% of the maximum heating power.

The stirrer used in the examples was a hollow-shaft stirrer in which the gas was introduced into the reaction mixture via a hollow stirrer shaft. The stirrer body attached to the hollow shaft comprised four arms, had a diameter of 35 mm and a height of 14 mm. Each end of the arm had two gas outlets of 3 mm in diameter attached to it. The rotation of the stirrer gave rise to a reduced pressure such that the gas present above the reaction mixture ($CO_2$ and possibly alkylene oxide) was drawn off and introduced through the hollow shaft of the stirrer into the reaction mixture.
Methods The polyethercarbonate polyols used were chemically characterized by $^1H$ NMR spectroscopy. For this purpose, a sample of the purified reaction mixture in each case was dissolved in deuterated chloroform and measured on a Bruker spectrometer (AV400, 400 MHz).

The terpolymerization of propylene oxide, at least two unsaturated compounds and $CO_2$ results not only in the cyclic propylene carbonate but also in the polyether carbonate polyol having unsaturated groups, comprising firstly polycarbonate units shown in formula (XIIIa)×

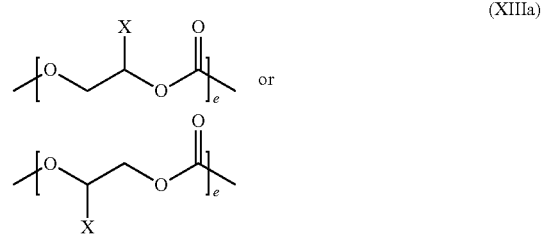

(XIIIa)

and secondly polyether units shown in formula (XIIIb):

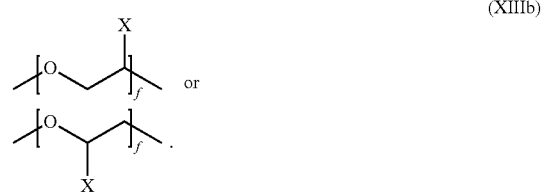

(XIIIb)

The reaction mixture was characterized by $^1H$ NMR spectroscopy and gel permeation chromatography.

The ratio of the amount of cyclic propylene carbonate to polyethercarbonate polyol (selectivity; ratio g/e) and also the fraction of unreacted monomers (propylene oxide $R_{PO}$, allyl glycidyl ether $A_{double\ bond}$ in mol %, maleic anhydride $B_{double\ bond}$ in mol %) were determined by means of $^1H$-NMR spectroscopy.

Subsequently, the reaction mixture was diluted with dichloromethane (20 mL) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyethercarbonate polyol (ratio e/f) and also the molar fraction of allyl glycidyl ether and maleic anhydride incorporated into the polymer were determined by means of $^1$H-NMR spectroscopy.

The relevant resonances in the $^1$H-NMR spectrum (based on TMS=0 ppm) which were used for integration are as follows:

| Signal | Shift in ppm | Designation | Area corresponds to number of H atoms |
|---|---|---|---|
| I1 | 1.10-1.17 | CH$_3$ group of the polyether units | 3 |
| I2 | 1.25-1.34 | CH$_3$ group of the polycarbonate units | 3 |
| I3 | 1.45-1.48 | CH$_3$ group of the cyclic carbonate | 3 |
| I4 | 2.95-3.00 | CH groups of the free propylene oxide not consumed by reaction | 1 |
| I5 | 5.83-5.94 | CH group of the double bond obtained in the polymer via the incorporation of allyl glycidyl ether | 1 |
| I6 | 6.22-6.29 | CH group of the double bond obtained in the polymer via the incorporation of maleic anhydride | 2 |
| I7 | 7.03-7.04 | CH group for free maleic anhydride not consumed by reaction | 2 |
| I8 | 2.85-2.90 | CH groups of the free allyl glycidyl ether not consumed by reaction | 1 |

The FIGURE reported is the molar ratio of the amount of cyclic propylene carbonate to carbonate units in the polyether carbonate polyol (selectivity g/e) and the molar ratio of carbonate groups to ether groups in the polyether carbonate polyol (e/f), and also the fractions of the unreacted propylene oxide (in mol %) and maleic anhydride (in mol %).

Taking account of the relative intensities, the values were calculated as follows: Molar ratio of the amount of cyclic propylene carbonate to carbonate units in the polyether carbonate polyol (selectivity g/e):

$$g/e=I3/I2$$

Molar ratio of carbonate groups to ether groups in the polyethercarbonate polyol (e/f):

$$e/f=I2/I1$$

The proportion of carbonate units ($C'_{carbonate}$ in mol %) in the repeat units of the polyethercarbonate polyol obtained from the terpolymerization of propylene oxide, allyl glycidyl ether and CO$_2$:

$$C_{carbonate} \text{ in mol \%}=[(I2/3)/((I1/3)+(I2/3)+(I5))] \times 100\%$$

The proportion of carbonate units ($C'_{carbonate}$ in % by weight) in the repeat units of the polyethercarbonate polyol obtained from the terpolymerization of propylene oxide, allyl glycidyl ether and CO$_2$:

$$C'_{carbonate} \text{ in \% by weight}=[(I2/3)*44/((I1/3)*58+(I2/3)*102+(I5)*114)] \times 100\%$$

The proportion of double bonds resulting from the incorporation of allyl glycidyl ether ($A_{double\,bond}$ in mol %) in the repeat units of the polyethercarbonate polyol:

$$A_{double\,bond} \text{ in mol \%}=[(I5)/((I1/3)+(I2/3)+(I5))] \times 100\%$$

The proportion of carbon-carbon double bonds ($A_{double\,bond}$ in % by weight) in the repeat units of the polyethercarbonate polyol obtained from the terpolymerization of propylene oxide, allyl glycidyl ether and CO$_2$:

$$A_{double\,bond} \text{ in \% by weight}=[(I5)*28/((I1/3)*58+(I2/3)*102+(I5)*114)] \times 100\%$$

The molar proportion of the unconverted propylene oxide ($R_{PO}$ in mol %) based on the sum total of the amount of propylene oxide used in the activation and the copolymerization, calculated by the formula:

$$R_{PO}=[(I4)/((I1/3)+(I2/3)+(I3/3)+(I4)+(I5)+(I8))] \times 100\%$$

The molar proportion of the unconverted allyl glycidyl ether ($R_{AGE}$ in mol %) based on the sum total of the amount of maleic anhydride used in the activation and the copolymerization is calculated by the formula:

$$R_{AGE}=[(I8)/((I1/3)+(I2/3)+(I3/3)+(I4)+(I5)+(I8))] \times 100\%$$

The proportion of carbonate units ($C'_{carbonate}$ in mol %) in the repeat units of the polyetherestercarbonate polyol obtained from the terpolymerization of propylene oxide, maleic anhydride and CO2:

$$C'_{carbonate}(\text{mol \%})=[(I2/3)/((I1/3)+(I2/3)+(I6/2))] \times 100\%$$

The proportion of carbonate units ($C_{carbonate}$ in % by weight) in the repeat units of the polyethercarbonate polyol obtained from the terpolymerization of propylene oxide, allyl glycidyl ether and CO$_2$:

$$C'_{carbonate}(\text{\% by weight})=[(I2/3)*44/((I1/3)*58+(I2/3)*102+(I5)*98)] \times 100\%$$

The proportion of the double bonds which result via the incorporation of the maleic anhydride ($B_{double\,bond}$ in mol %) in the repeat units of the polyetherestercarbonate polyol:

$$B_{double\,bond}(\text{mol \%})=[(I6/2)/((I1/3)+(I2/3)+(I6/2))] \times 100\%$$

The proportion of carbon-carbon double bonds ($B_{double\,bond}$ in % by weight) in the repeat units of the polyethercarbonate polyol obtained from the terpolymerization of propylene oxide, allyl glycidyl ether and CO$_2$:

$$B_{double\,bond}(\text{\% by weight})=[(I2/3)*44/((I1/3)*58+(I2/3)*102+(I5)*98)] \times 100\%$$

The molar proportion of the unconverted propylene oxide ($R_{MA}$ in mol %) based on the sum total of the amount of propylene oxide used in the activation and the copolymerization, calculated by the formula:

$$R'_{PO}=[(I4)/((I1/3)+(I2/3)+(I3/3)+(I4)+(I6/2)+(I7/2))] \times 100\%$$

The molar proportion of the unconverted maleic anhydride ($R_{MA}$ in mol %) based on the sum total of the amount of maleic anhydride used in the activation and the copolymerization is calculated by the formula:

$$R_{MA}=[(I7/2)/((I1/3)+(I2/3)+(I3/3)+(I4)+(I6/2)+(I7/2))] \times 100\%$$

The number-average $M_n$ and the weight-average $M_w$ molecular weights of the polyethercarbonate polyols used were determined by means of gel permeation chromatography (GPC). The procedure was that of DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 µm; RID detector). Polystyrene samples of known molar mass were used for calibration. The polydispersity was calculated as the ratio $M_w/M_n$.

The OH number (hydroxyl number) was determined in a method based on DIN 53240-2, but using N-methylpyrrolidone instead of THF/dichloromethane as solvent. A 0.5 molar ethanolic KOH solution was used for titration (endpoint recognition by potentiometry). The test substance used was castor oil with certified OH number. The unit expressed as "mg/g" relates to mg[KOH]/g[polyether carbonate polyol].

The NCO index is defined as the molar ratio of isocyanate groups and OH groups in the reaction mixture.

For the rheological determination of the gel time, a sample of the polyethemarbonate polyol was admixed with an equimolar amount of a polyisocyanate (diisocyanate and/or triisocyanate) and dibutyltin laurate (1% by weight). The complex moduli G' (storage modulus) and G" (loss modulus) were determined in an oscillation measurement at 60° C. and a frequency of 1 Hz, using a plate/plate configuration with a plate diameter of 15 mm, a plate-to-plate distance of 1 mm, and a 10 percent deformation. The gel point was defined as the juncture at which storage modulus (G) and loss modulus (G") are of the same of magnitude (G'/G"=1). For determination of the storage modulus (G) after 2 hours, the value of the storage modules attained at this time, measured in Pa, was read off.

For the rheological determination of the adhesion fracture energy (bonding force), a sample of the prepolymer was applied to the measurement plate of the rheometer. The breaking force ($F_N$) and elongation at break (d) were determined in a bonding force measurement at 30° C., using a plate-plate configuration having a plate diameter of 15 mm and a plate-to-plate distance of 0.8 mm. The sample was first pressed at a compression force of 10 N. Subsequently, the upper plate was raised at a speed of −2.5 mm/s and the breaking force ($F_N$) was determined over the incremental distances di until the sample broke. The adhesion fracture energy was calculated by the following formula where "r" is the radius of the upper plate (r=7.5 mm), and is reported in N/mm.

$$E_{ad} = \Sigma_i (F_{N,i} \times d_i / \pi) / (r^2 \times \pi)$$

The infrared (IR) spectroscopy measurements were effected on a Bruker Alpha-P FT-IR spectrometer, the measurements were effected in pure substance; the wavenumber of the maximum of the signal for the C=C stretch vibration is reported.

The double bond content of the prepolymers is found as the quotient of the reported double bond content of the polyethercarbonate polyols used (reported in $C_2H_4$ equivalents per unit mass of polyethercarbonate polyol), based on the total mass of the reactants used (polyethercarbonate polyol, isocyanate mixture, catalyst), and is reported in $C_2H_4$ equivalents per unit mass of prepolymer.

The $CO_2$ content of the prepolymers is found as the quotient of the $CO_2$ content of the polyethercarbonate polyol used, based on the total mass of the reactants used (polyethercarbonate polyol, isocyanate mixture B1 and B2, catalyst).

Preparation of a Difunctional Polyethercarbonate Polyol (PEC-1) Containing Electron-Deficient Double Bonds:

A 970 ml pressure reactor equipped with a sparging stirrer was charged with a mixture of DMC catalyst (70 mg) and PET-1 (80 g) and this initial charge was stirred at 130° C. for 30 minutes under a partial vacuum (50 mbar), with argon being passed through the reaction mixture. Following injection of 15 bar of $CO_2$, at which a slight drop in temperature was observed, and following re-establishment of a temperature of 130° C., 80 g of a monomer mixture (11.0% by weight of maleic anhydride [corresponding to 6.8 mol %] in solution in propylene oxide) were metered in by means of an HPLC pump (1 ml/min). The reaction mixture was stirred (800 rpm) at 130° C. for 20 min. The addition of 8.0 g of the monomer mixture was repeated a second and third time. After cooling to 100° C. had taken place, a further 246.0 g of the monomer mixture (11.0% by weight of maleic anhydride in solution in propylene oxide) were metered in via an HPLC pump (1 ml/min), the $CO_2$ pressure being held constant at 15 bar. The reaction mixture was subsequently stirred at 100° C. for a further 1 h. The reaction was halted by cooling of the reactor with ice-water.

Characterization of the polyethercarbonate polyol obtained by the methods specified in WO 2015032737 A1 gave an OH number of 23.1 $mg_{KOH}$/g, a $CO_2$ content of 16.79% by weight, a molecular weight $M_n$ of 6157 g/mol, a polydispersity index (PDI) of 2.05 and a double bond content of 2.03% by weight.

Preparation of a Difunctional Polyethercarbonate Polyol (PEC-2) Containing Electron-Rich Double Bonds:

A 970 ml pressure reactor equipped with a sparging stirrer was charged with a mixture of DMC catalyst (48 mg) and PET-1 (80 g) and this initial charge was stirred at 130° C. for 30 minutes under a partial vacuum (50 mbar), with argon being passed through the reaction mixture. Following injection of 15 bar of $CO_2$, at which a slight drop in temperature was observed, and following re-establishment of a temperature of 130° C., 8.0 g of a monomer mixture (16.7% by weight of allyl glycidyl ether [corresponding to 9.3 mol %] in solution in propylene oxide) were metered in by means of an HPLC pump (1 ml/min). The reaction mixture was stirred (800 rpm) at 130° C. for 20 min. The addition of 8.0 g of the monomer mixture was repeated a second and third time. After cooling to 100° C. had taken place, a further 136.0 g of the monomer mixture (16.7% by weight of allyl glycidyl ether) were metered in via an HPLC pump (1 ml/min), the $CO_2$ pressure being held constant at 15 bar. The reaction mixture was subsequently stirred at 100° C. for a further 1 h. The reaction was halted by cooling of the reactor with ice-water.

Characterization of the polyethercarbonate polyol obtained by the methods specified in WO 2015032737 A1 gave an OH number of 36.8 $mg_{KOH}$/g, a $CO_2$ content of 9.92% by weight, a molecular weight M, of 3795 g/mol, a PDI of 1.10 and a double bond content of 2.12% by weight.

Example Group A: Preparation of Prepolymers with PEC-1

Example A-1 (Comparative Example): Preparation of a Prepolymer Using a Polyethercarbonate Polyol (PEC-1) with 2.03% by Weight of Electron-Deficient Double Bonds and TDI as Diisocynate (Average Molar NCO Functionality 2.00)

PEC-1 (2.0 g), TDI (72 mg) and DBTL (1% by weight, 20.7 mg) were mixed in an aluminum beaker. Subsequently, a sample of the mixture (0.4 g) was used for the measurement on the rheometer and was heated to 60° C. for three hours.

The NCO index was 1.00.
The gel time was 35 min.
The storage modulus G' after 2 h was $5.65 \cdot 10^3$ Pa.
The adhesion fracture energy was −0.16 N/mm.
Analysis of the sample obtained by means of IR spectroscopy showed the characteristic signal for double bonds at 1645 $cm^{-1}$.
The double bond content of the sample obtained was 1.94% by weight.
The $CO_2$ content of the sample obtained was 1621% by weight.

Example A-2 (Comparative Example): Preparation of a Prepolymer Using a Polyethercarbonate Polyol (PEC-1) with 2.03% by Weight of Electro-Deficient Double Bonds and a Mixture of TDI as Diisocyanate and HDI Trimer as Triisocyanate in a Molar Ratio of 93:7 (Average Molar NCO Functionality 2.07)

PEC-1 (2.0 g), TDI (65 mg), HDI trimer (15 mg) and DBTL (1% by weight, 20.6 mg) were mixed in an aluminum beaker. Subsequently, a sample of the mixture (0.4 g) was used on the rheometer and was heated to 60° C. for three hours.
The NCO index was 1.00.
The gel time was 17 min.
The storage modulus G' after 2 h was $1.76 \cdot 10^3$ Pa.
The adhesion fracture energy was −0.105 N/mm.
Analysis of the sample obtained by means of IR spectroscopy showed the characteristic signal for double bonds at 1645 $cm^{-1}$.
The double bond content of the sample obtained was 1.93% by weight.
The $CO_2$ content of the sample obtained was 16.15% by weight.

Example A-3: Preparation of a Prepolymer Using a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 87:13 (Average Molar NCO Functionality 2.15)

PEC-1 (2.0 g), TDI (58 mg), HDI trimer (29 mg) and DBTL (20.6 mg, 1% by weight) were mixed in an aluminum beaker. Subsequently, a sample of the mixture (0.4 g) was used on the rheometer and was heated to 60° C. for three hours.
The NCO index was 1.00.
The gel time was 15.6 min.
The storage modulus G' after 2 h was $9.88 \cdot 10^3$ Pa.
The adhesion fracture energy was −0.076 N/mm.
Analysis by means of IR spectroscopy showed the characteristic signal for double bonds at 1645 $cm^{-1}$.
The double bond content of the sample obtained was 1.93% by weight.
The $CO_2$ content of the sample obtained was 16.09% by weight.

Example A-4: Preparation of a Prepolymer Using a Polycarbonate Polyol (PEC-1) with 2.03% by Weight of Electron-Deficient Double Bonds and a Mixture of TDI as Diisocyanate and HDI Trimer as Triisocyanate in a Molar Ratio of 79:21 (Average Molar NCO Functionality 2.23)

PEC-1 (2.0 g), TDI (50 mg), HDI trimer (44 mg) and DBTL (20.5 mg, 1% by weight) were mixed in an aluminum beaker. Subsequently, a sample of the mixture (0.4 g) was used on the rheometer and was heated to 60° C. for three hours.
The NCO index was 1.00.
The gel time was 14.4 min.
The storage modulus G' after 2 h was $8.15 \cdot 10^3$ Pa.
The adhesion fracture energy was −0.076 N/mm.
Analysis by means of IR spectroscopy showed the characteristic signal for double bonds at 1645 $cm^{-1}$.
The double bond content of the sample obtained was 1.92% by weight.
The $CO_2$ content of the sample obtained was 16.03% by weight.

Example A-5: Preparation of a Prepolymer a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 71:29 (Average Molar NCO Functionality 2.32)

PEC-1 (2.0 g), TDI (43 mg), HDI trimer (58 mg) and DBTL (20.4 mg, 1% by weight) were mixed in an aluminum beaker. Subsequently, a sample of the mixture (0.4 g) was used on the rheometer and was heated to 60° C. for three hours.
The NCO index was 1.00.
The gel time was 6.9 min.
The storage modulus G' after 2 h was $4.83 \cdot 10^4$ Pa.
The adhesion fracture energy was −0.075 N/mm.
Analysis by means of IR spectroscopy showed the characteristic signal for double bonds at 1645 $cm^{-1}$.
The double bond content of the sample obtained was 1.91% by weight.
The $CO_2$ content of the sample obtained was 16.21% by weight

Example A-6: Preparation of a Prepolymer Using a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 62:38 (Average Molar NCO Functionality 2.42)

PEC-1 (2.0 g), TDI (36 mg), HDI trimer (73 mg) and DBTL (20.4 mg, 1% by weight) were mixed in an aluminum beaker. Subsequently, a sample of the mixture (0.4 g) was used on the rheometer and was heated to 60° C. for three hours.
The NCO index was 1.00.
The gel time was 6.8 min.
The storage modulus G' after 2 h was 5.83 10' Pa.
The adhesion fracture energy was −0.073 N/mm.
Analysis by means of IR spectroscopy showed the characteristic signal for double bonds at 1645 $cm^{-1}$.
The double bond content of the sample obtained was 1.91% by weight.
The $CO_2$ content of the sample obtained was 15.92% by weight.

Example A-7: Preparation of a Prepolymer Using a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 52:48 (Average Molar NCO Functionality 2.53)

PEC-1 (2.0 g), TDI (29 mg), HDI trimer (88 mg) and DBTL (203 mg, 1% by weight) were mixed in an aluminum beaker. Subsequently, a sample of the mixture (0.4 g) was used on the rheometer and was heated to 60° C. for three hours.
The NCO index was 1.00.
The gel time was 5.9 min.
The storage modulus G' after 2 h was $4.29 \cdot 10^4$ Pa.
The adhesion fracture energy was −0.041 N/mm.

Analysis by means of IR spectroscopy showed the characteristic signal for double bonds at 1645 cm$^{-1}$.

The double bond content of the sample obtained was 1.90% by weight.

The $CO_2$ content of the sample obtained was 15.87% by weight.

Example A-8: Preparation of a Prepolymer Using a Polyethercarbonate Polyol (PEC-1) with 2.03% by Weight of Electron-Deficient Double Bonds and a Mixture of TDI as Diisocynate and HDI Trimer as Triisocyanate in a Molar Ratio of 41:59 (Average Molar NCO Functionality 2.64)

PEC-1 (2.0 g), TDI (22 mg), HDI trimer (102 mg) and DBTL (20.2 mg, 1% by weight) were mixed in an aluminum beaker. Subsequently, a sample of the mixture (0.4 g) was used on the rheometer and was heated to 60° C. for three hours.

The NCO index was 1.00.

The gel time was 4.8 min.

The storage modulus G' after 2 h was 1.2110 Pa.

The adhesion fracture energy was −0.036 N/mm.

Analysis by means of IR spectroscopy showed the characteristic signal for double bonds at 1645 cm$^{-1}$.

The double bond content of the sample obtained was 1.89% by weight.

The $CO_2$ content of the sample obtained was 15.81% by weight.

Example A-9: Preparation of a Prepolymer Using a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 28:72 (Average Molar NCO Functionality 2.79)

PEC-1 (2.0 g), TDI (14 mg), HDI trimer (117 mg) and DBTL (20.1 mg, 1% by weight) were mixed in an aluminum beaker. Subsequently, a sample of the mixture (0.4 g) was used on the rheometer and was heated to 60° C. for three hours.

The NCO index was 1.00.

The gel time was 5.4 min.

The storage modulus G' after 2 h was 1.19·10$^5$ Pa.

The adhesion fracture energy was −0.019 N/mm.

Analysis by means of IR spectroscopy showed the characteristic signal for double bonds at 1645 cm$^{-1}$.

The double bond content of the sample obtained was 1.89% by weight.

The $CO_2$ content of the sample obtained was 15.76% by weight.

Example A-10 (Comparative Example): Preparation of a Prepolymer Using a Polyethercarbonate Polyol (PEC-1) with 2.03% by Weight of Electron-Deficient Double Bonds and a Mixture of TDI as Diisocyanate and HDI Trimer as Triisocyanate in a Molar Ratio of 15:85 (Average Molar NCO Functionality 2.94)

PEC-1 (2.0 g), TDI (7 mg), HDI trimer (131 mg) and DBTL (20.1 mg, 1% by weight) were mixed in an aluminum beaker. Subsequently, a sample of the mixture (0.4 g) was used on the rheometer and was heated to 60° C. for three hours.

The NCO index was 1.00.

The gel time was 5.00 min.

The storage modulus G' after 2 h was 1.76·10$^5$ Pa.

The adhesion fracture energy was −0.009 N/mm.

Analysis by means of IR spectroscopy showed the characteristic signal for double bonds at 1645 cm$^{-1}$.

The double bond content of the sample obtained was 1.88% by weight.

The $CO_2$ content of the sample obtained was 15.70% by weight.

Example A-11 (Comparative Example): Preparation of a Prepolymer Using a Polyethercarbonate Polyol (PEC-1) with 2.03% by Weight of Electron-Deficient Double Bonds and HDI Trimer as Triisocyanate (Average Molar NCO Functionality 3.10)

PEC-1 (2.0 g), HDI trimer (146 mg) and DBTL (20.0 mg, 1% by weight) were mixed in an aluminum beaker. Subsequently, a sample of the mixture (0.4 g) was used on the rheometer and was heated to 60° C. for three hours.

The NCO index was 1.00.

The gel time was <1 min.

The storage modulus G' after 2 h was 1.93·10$^5$ Pa.

The adhesion fracture energy was below the measurement limit.

Analysis by means of IR spectroscopy showed the characteristic signal for double bonds at 1645 cm$^{-1}$.

The double bond content of the sample obtained was 1.87% by weight.

The $CO_2$ content of the sample obtained was 15.65% by weight

Comparison

Table 1 below shows a comparison of the results obtained using a mixture of diisocyanate and triisocyanate with an average functionality of ≥2.15 to ≤2.9 (Examples A-3 to A-9) by comparison with the results obtained using a mixture of diisocyanate and triisocyanate with an average functionality of ≤2.11 or a diisocyanate (comparative examples A-1 and A-2) and by comparison with the results obtained with use of a mixture of diisocyanate and triisocyanate with an average functionality of ≥2.94 or of a triisocyanate only (comparative examples A-10 and A-11).

TABLE 1

| | Molar ratio | | | Average molar NCO functionality of B1 and B2 [—] | Gel point [min] | Adhesion fracture energy [N/mm] | G' after 2 h [Pa] |
|---|---|---|---|---|---|---|---|
| Example | PEC-I (A) | TDI (B1) | HDI trimer (B2) | | | | |
| A-1 (comp.) | 10 | 10 | 0 | 2.00 | 35.0 | −0.160 | 5.65 · 10$^2$ |

TABLE 1-continued

| Example | Molar ratio | | | Average molar NCO functionality of B1 and B2 [—] | Gel point [min] | Adhesion fracture energy [N/mm] | G' after 2 h [Pa] |
|---|---|---|---|---|---|---|---|
| | PEC-I (A) | TDI (B1) | HDI trimer (B2) | | | | |
| A-2 (comp.) | 10 | 9 | 1 | 2.07 | 17.0 | −0.105 | $1.76 \cdot 10^3$ |
| A-3 | 10 | 8 | 2 | 2.15 | 15.6 | −0.076 | $9.88 \cdot 10^3$ |
| A-4 | 10 | 7 | 3 | 2.23 | 14.4 | −0.076 | $8.15 \cdot 10^3$ |
| A-5 | 10 | 6 | 4 | 2.32 | 6.9 | −0.075 | $4.83 \cdot 10^4$ |
| A-6 | 10 | 5 | 5 | 2.42 | 6.8 | −0.073 | $5.83 \cdot 10^4$ |
| A-7 | 10 | 4 | 6 | 2.53 | 5.9 | −0.041 | $4.29 \cdot 10^4$ |
| A-8 | 10 | 3 | 7 | 2.64 | 4.8 | −0.036 | $1.21 \cdot 10^5$ |
| A-9 | 10 | 2 | 8 | 2.79 | 5.4 | −0.019 | $1.19 \cdot 10^5$ |
| A-10 (comp.) | 10 | 1 | 9 | 2.94 | 5.0 | −0.009 | $1.76 \cdot 10^5$ |
| A-11 (comp.) | 10 | 0 | 10 | 3.10 | <1 | none | $1.93 \cdot 10^5$ | comp.: comparative example;
B1: isocyanate with functionality 2.00;
B2: isocyanate with functionality 3.10

Table 1 shows that, using an inventive mixture of diisocyanate and triisocyanate having an average functionality of the NCO component within the range envisaged in accordance with the invention (average functionality of ≥2.15 to ≤2.90), a polymer elastomer precursor having low adhesion fracture energy (low bonding force) is obtained (examples A-3 to A-9). By contrast, below an average NCO functionality of 2.15, a strongly adhering (highly tacky) gel with high adhesion fracture energy is obtained (comparative examples A-1 to A-2), and, above an average NCO functionality of 2.9, a material having a high storage modulus is produced (comparative examples A-10 to A-11). More particularly, when a diisocyanate only is used, a gel having high adhesion fracture energy (high bonding force) is obtained (comparative example A-1), and, when a triisocyanate only is used, a polyurethane polymer having a high storage modulus is obtained (comparative example A-11).

Example Group B: Preparation of Prepolymers with PEC-2

Example B-1 (Comparative Example): Preparation of a Prepolymer Using a Polyethercarbonate Polyol (PEC-1) with 2.12% by Weight of Relatively Electron-Rich Double Bonds and TDI as Diisocyanate (Average Molar NCO Functionality 2.00)

PEC-2 (1.3 g), TDI (72 mg) and DBTL (1% by weight, 20.7 mg) were mixed in an aluminum beaker. Subsequently, a sample of the mixture (0.4 g) used for the measurement on the rheometer and heated to 60° C. for three hours.

The NCO index was 1.00.
The gel point was not attained within the measurement time.
The storage modulus G' after 2 h was 12.7 Pa.
The adhesion fracture energy was below the measurement limit.
Analysis of the sample obtained by means of IR spectroscopy showed the characteristic signal for double bonds at 1645 cm$^{-1}$.
The double bond content of the sample obtained was 2.03% by weight.

The $CO_2$ content of the sample obtained was 9.38% by weight.

Example B-2: Preparation of a Prepolymer Using a Polyethercarbonate Polyol (PEC-2) with 2.12% by Weight of Relatively Electron-Rich Double Bonds and a Mixture of TDI as Diisocyanate and HDI Trimer as Triisocyanate in a Molar Ratio of 41:59 (Average Molar NCO Functionality 2.64)

PEC-2 (1.3 g), TDI (22 mg), HDI trimer (102 mg) and DBTL (1% by weight, 20.6 mg) were mixed in an aluminum beaker. Subsequently, a sample of the mixture (0.4 g) was used on the rheometer and was heated to 60° C. for three hours.

The NCO index was 1.00.
The gel time was 25.3 min.
The storage modulus G' after 2 h was $1.3 \cdot 10^3$ Pa.
The adhesion fracture energy was −0.104 N/mm.
Analysis of the sample obtained by means of IR spectroscopy showed the characteristic signal for double bonds at 1645 cm$^{-1}$.
The double bond content of the sample obtained was 2.02% by weight.
The $CO_2$ content of the sample obtained was 9.23% by weight.

Example B-3: Preparation of a Prepolymer Using a Polyethercarbonate Polyol (PEC-2) with 2.12% by Weight of Relatively Electron-Rich Double Bonds and a Mixture of TDI as Diisocyanate and HDI Trimer as Triisocyanate in a Molar Ratio of 28:72 (Averse Molar NCO Functionality 2.79)

PEC-2 (1.3 g), TDI (14 mg), HDI trimer (117 mg) and DBTL (1% by weight, 20.6 mg) were mixed in an aluminum beaker. Subsequently, a sample of the mixture (0.4 g) was used on the rheometer and was heated to 60° C. for three hours.

The NCO index was 1.00.
The gel time was 4.5 min.
The storage modulus G' after 2 h was $1.6 \cdot 10^3$ Pa.
The adhesion fracture energy was −0.005 N/mm.

Analysis of the sample obtained by means of IR spectroscopy showed the characteristic signal for double bonds at 1645 $cm^{-1}$.

The double bond content of the sample obtained was 2.01% by weight.

The $CO_2$ content of the sample obtained was 9.18% by weight.

Example B-4 (Comparative Example): Preparation of a Prepolymer Using a Polyethercarbonate Polyol (PEC-2 with 2.12% by Weight of Relatively Electron-Rich Double Bonds and HDI Trimer as Triisocyanate (Average Molar NCO Functionality 3.10)

PEC-2 (13 g), HDI trimer (146 mg) and DBTL (20.0 mg, 1% by weight) were mixed in an aluminum beaker. Subsequently, a sample of the mixture (0.4 g) was used on the rheometer and was heated to 60° C. for three hours.

The NCO index was 1.00.
The gel time was 2.3 min.
The storage modulus G' after 2 h was $1.4 \cdot 10^5$ Pa.
The adhesion fracture energy was below the measurement limit.

Analysis of the sample obtained by means of IR spectroscopy showed the characteristic signal for double bonds at 1645 $cm^{-1}$.

The double bond content of the sample obtained was 1.96% by weight.

The $CO_2$ content of the sample obtained was 9.13% by weight.

Comparison

Table 2 below shows a comparison of the results obtained using a mixture of diisocyanate and triisocyanate with an average functionality of ≥2.15 to ≤52.90 (examples B-2 to B-3) by comparison with the results obtained using a diisocyanate (comparative example B-1) and the results obtained using a triisocyanate only (comparative example B-4).

TABLE 2

| Example | Molar ratio | | | Average molar NCO functionality of B1 and B2 [—] | Gel point [min] | Adhesion fracture energy [N/mm] | G' after 2 h [Pa] |
|---|---|---|---|---|---|---|---|
| | PEC-II (A) | TDI (B1) | HDI trimer (B2) | | | | |
| B-1 (comp.) | 10 | 10 | 0 | 2.00 | >120 | — | 12.7 |
| B-2 | 10 | 4.1 | 5.9 | 2.64 | 25.3 | −0.104 | $1.3 \cdot 10^3$ |
| B-3 | 10 | 2.8 | 7.2 | 2.79 | 4.5 | −0.005 | $1.6 \cdot 10^3$ |
| B-4 (comp.) | 10 | 0 | 100 | 3.10 | 2.3 | none | $1.4 \cdot 10^5$ | comp.: comparative example;
B1: isocyanate with functionality 2;
B2: isocyanate with functionality 3

Table 2 shows that, using an inventive mixture of diisocyanate and triisocyanate having an average functionality of the NCO component within the range envisaged in accordance with the invention (average functionality ≥2.15 to ≤2.9), a polymer elastomer precursor having low adhesion fracture energy (low bonding force) is obtained (examples B-2 to B-3). By contrast, when a diisocyanate only is used, a liquid that cannot be processed on the standard machines is obtained (comparative example B-1), and, when a triisocyanate only is used, a polyurethane polymer having a high storage modulus is obtained (comparative example B-4).

The invention claimed is:

1. A process for preparing a prepolymer containing carbon-carbon multiple bonds, comprising reacting a polyol component A which comprises a polyethercarbonate polyol containing carbon-carbon multiple bonds, with an isocyanate-containing component B which comprises at least one polyisocyanate B1 having an average molar NCO functionality of 2.0 to 2.2 and at least one polyisocyanate B2 having an average molar NCO functionality of 2.8 to 3.2,
   and the content of carbon-carbon multiple bonds in the polyethercarbonate polyol is from 0.5% by weight to 17.0% by weight.

2. The process as claimed in claim 1, wherein the polyethercarbonate polyol containing carbon-carbon multiple bonds, is obtainable by addition of an alkylene oxide, at least one monomer containing carbon-carbon multiple bonds and carbon dioxide onto an H-functional starter compound in the presence of a double metal cyanide catalyst.

3. The process as claimed in claim 1, wherein the polyethercarbonate polyol containing carbon-carbon multiple bonds has a carbon dioxide content of 3% by weight to 50% by weight.

4. The process as claimed in claim 2, wherein the monomer containing at least one carbon-carbon multiple bond comprises at least one of the monomers comprising
   (a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, partly epoxidized fats and oils and/or mixtures thereof
   (b) alkylene oxide with double bond of the general formula (IX):

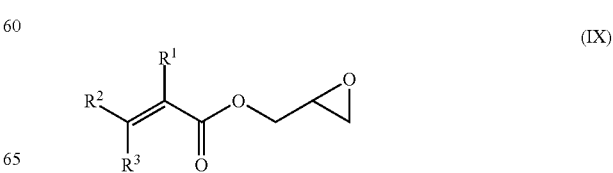

wherein $R_1$, R2 and $R_3$ are each independently hydrogen, halogen, substituted C1-C22 alkyl, unsubstituted C1-C22 alkyl, substituted C6-C12 aryl, or unsubstituted C6-C12 aryl (c) cyclic anhydrides which correspond to the general formula (X), (XI) or (XII):

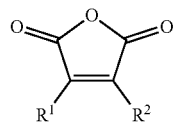
(X)

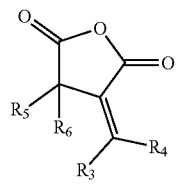
(XI)

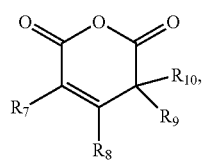
(XII)

wherein $R_1$ to $R_{10}$ are each independently hydrogen, halogen, substituted C1-C22 alkyl, unsubstituted C1-C22 alkyl, or substituted C6-C12 aryl, or unsubstituted C6-C12 aryl, (d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride and (e) alkylene oxides with substituents having carbon-carbon triple bonds.

5. The process as claimed in claim 4, wherein the at least one monomer containing at least one carbon-carbon multiple bond comprises at least one of (a) allyl glycidyl ether, vinylcyclohexene oxide and limonene oxide, (b) glycidyl acrylate and glycidyl methacrylate, (c) maleic anhydride and itaconic anhydride, (d) 4-cyclohexene-1,2-dioic anhydride and 5,6-norbornene-2,3-dioic anhydride and (e) glycidyl propargyl ether.

6. The process as claimed in claim 1, wherein the isocyanate-containing component B comprises at least 2 polyisocyanates selected from hexamethylene diisocyanate, diphenylmethane diisocyanate, toluene diisocyanate, the trimerization or higher oligomerization products thereof, and adducts thereof.

7. The process as claimed in claim 1, wherein the polyisocyanates B1 and B2 comprise a mixture of a diisocyanate monomer and a diisocyanate trimer.

8. The process as claimed in claim 1, wherein an NCO index in the preparation of the prepolymer is 0.95 to 1.20.

9. A prepolymer containing carbon-carbon multiple bonds, obtainable by a process as claimed in claim 1.

10. A prepolymer as claimed in claim 9 having a content of carbon-carbon multiple bonds 0.5% by weight of to 15.0% by weight.

11. A process for producing an elastomer, comprising the steps of:
a-1) providing a prepolymer as claimed in claim 9, and
b-1) crosslinking the prepolymer.

12. A process for producing an elastomer, comprising the steps of:
a-2) providing a prepolymer prepared by a process as claimed in claim 1,
and
b-2) crosslinking the prepolymer.

13. An elastomer obtainable by a process as claimed in claim claim 12.

14. The process as claimed in claim 1, wherein said polyol component A comprises a polyethercarbonate polyol containing carbon-carbon double bonds.

15. The process as claimed in claim 1, wherein said isocyanate-containing compound B has an average molar functionality of from 2.40 to 2.80.

16. The process as claimed in claim 3, wherein the polyethercarbonate polyol containing carbon-carbon multiple bonds has a carbon dioxide content of 5 to 25% by weight.

17. The prepolymer as claimed in claim 9, wherein the carbon-carbon multiple bonds are carbon-carbon double bonds.

18. The prepolymer as claimed in claim 10 having a content of carbon-carbon multiple bonds of 1.0% by weight to 6.0% by weight.

19. The prepolymer as claimed in claim 10 having a content of carbon-carbon multiple bonds of 1.5% by weight to 3.0% by weight.

20. The process as claimed in claim 7, wherein the diisocyanate monomer comprises diphenylmethane diisocyanate and/or toluene diisocyanate, and the diisocyanate trimer comprises a hexamethylene diisocyanate based trimer.

* * * * *